United States Patent
Reardon

(10) Patent No.: US 9,804,251 B1
(45) Date of Patent: Oct. 31, 2017

(54) FIBER OPTIC DIRECTIONAL SENSOR WITH WIDE-FIELD OPTICAL FIELD EXPANDING ELEMENT AND METHOD

(71) Applicant: Patrick John Reardon, Madison, AL (US)

(72) Inventor: Patrick John Reardon, Madison, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 108 days.

(21) Appl. No.: 14/750,532

(22) Filed: Jun. 25, 2015

Related U.S. Application Data

(60) Provisional application No. 62/017,092, filed on Jun. 25, 2014.

(51) Int. Cl.
| | |
|---|---|
| *G01S 3/781* | (2006.01) |
| *G02B 6/32* | (2006.01) |
| *G02B 6/42* | (2006.01) |
| *G02B 27/00* | (2006.01) |
| *G01S 3/782* | (2006.01) |

(52) U.S. Cl.
CPC .............. *G01S 3/781* (2013.01); *G01S 3/782* (2013.01); *G02B 6/32* (2013.01); *G02B 6/4251* (2013.01); *G02B 27/0081* (2013.01)

(58) Field of Classification Search
None
See application file for complete search history.

(56) References Cited

U.S. PATENT DOCUMENTS

| | | | |
|---|---|---|---|
| 4,625,108 A | 11/1986 | Nestel et al. | |
| 5,005,979 A | 4/1991 | Sontag et al. | |
| 5,289,557 A * | 2/1994 | Sheinis | A61B 18/201 292/336.3 |
| 5,311,611 A * | 5/1994 | Migliaccio | G02B 3/00 385/120 |

(Continued)

OTHER PUBLICATIONS

Alter, et al., "An Introduction to Fiber Optic Imaging," Schott North America, Inc., Feb. 2007, pp. 10-55.

*Primary Examiner* — Kara E Geisel
*Assistant Examiner* — Amanda Merlino
(74) *Attorney, Agent, or Firm* — Maynard Cooper & Gale, P.C.; Jon E. Holland

(57) ABSTRACT

A fiber optic directional sensor has a substantially hemispherical dome surface and a substantially flat surface. The sensor is formed from a plurality of optical fibers fused to one another, and each optical fiber extends from the dome surface to the flat surface. One end of each optical fiber is substantially perpendicular to the sensor's dome surface, and the opposite end of the fiber is substantially perpendicular to the sensor's flat surface such that an end face of the fiber is substantially tangent to the dome surface, and another end face of the fiber is substantially tangent to the flat surface. The sensor further includes an optical element which expands the field of view of the sensor and chromatically controls the incoming light. Using the sensor, light from projectiles, such as missiles, bullets, and other weaponry, can be detected, and the locations of the projectiles can be determined.

21 Claims, 16 Drawing Sheets

(56) References Cited

U.S. PATENT DOCUMENTS

| | | |
|---|---|---|
| 8,666,212 B1 * | 3/2014 | Amirparviz .............. G02B 6/00 |
| | | 385/115 |
| 8,817,271 B1 | 8/2014 | Geary |
| 2011/0044559 A1 | 2/2011 | Erhard et al. |
| 2011/0188891 A1 | 8/2011 | Ryu et al. |
| 2011/0194752 A1 | 8/2011 | Pong |
| 2014/0176657 A1 | 6/2014 | Nemoto |
| 2014/0253984 A1 | 9/2014 | Kaima |

* cited by examiner

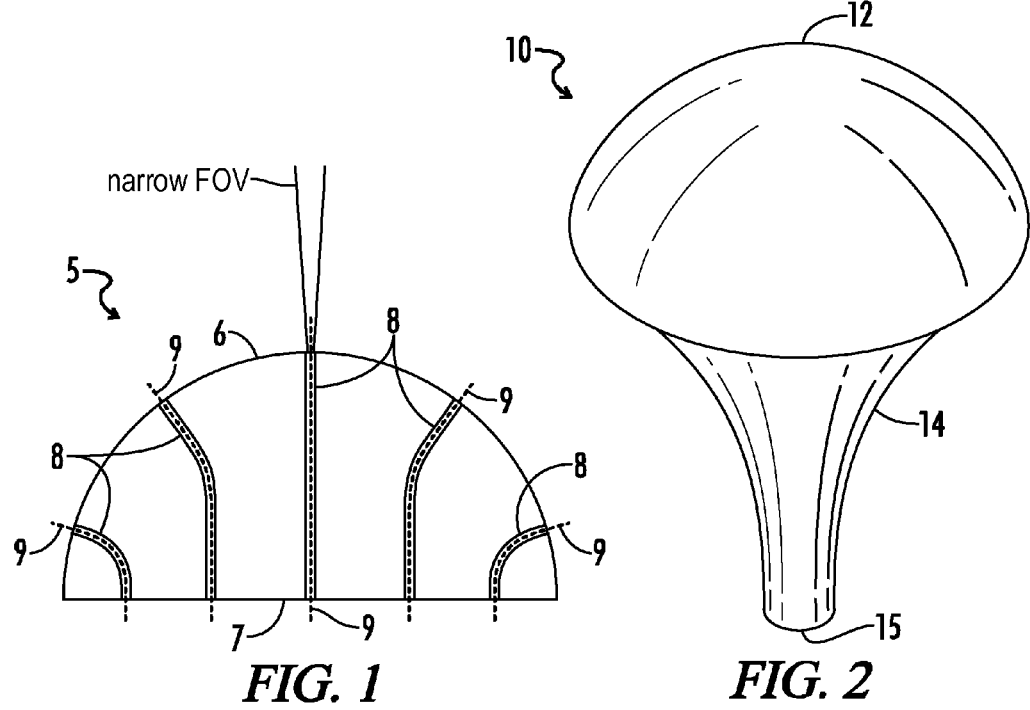
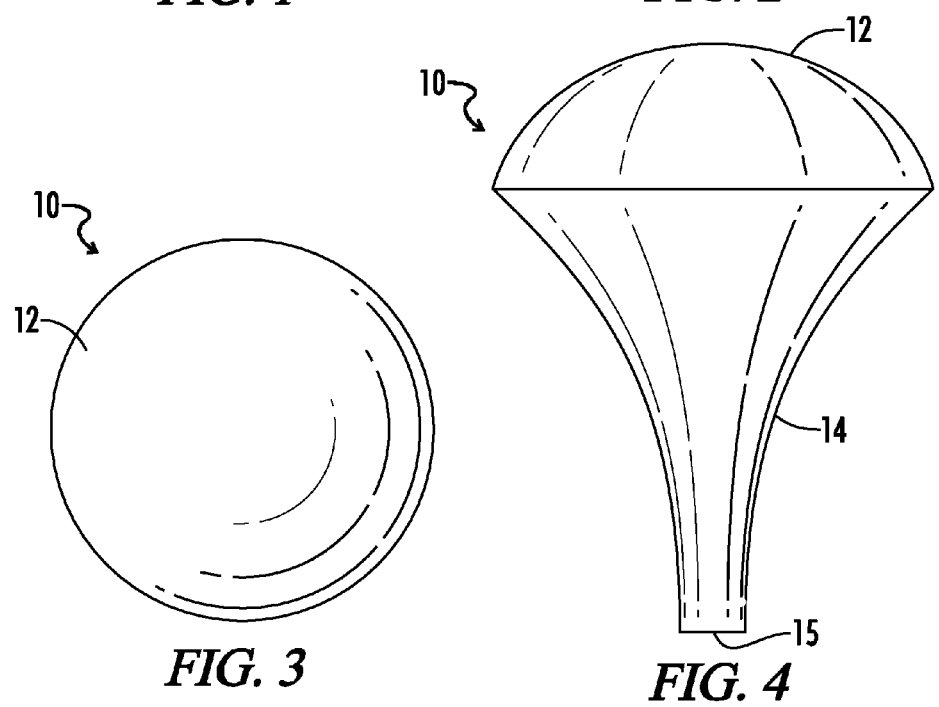

US 9,804,251 B1

FIBER OPTIC DIRECTIONAL SENSOR WITH WIDE-FIELD OPTICAL FIELD EXPANDING ELEMENT AND METHOD

CROSS REFERENCE TO RELATED APPLICATIONS

This application claims priority to U.S. Provisional Application No. 62/017,092, entitled "Fiber Optic Directional Sensor With Wide Field Optical Field Expanding Element and Method" and filed on Jun. 25, 2014, which is incorporated herein by reference.

RELATED ART

Launch detection based on light from projectiles, such as, for example, plumes during boost from ballistic missiles or rocket-propelled grenades (RPGs), or muzzle flashes from .50-caliber rifles, is of great concern in military applications. Launch detection of such projectiles is typically done using conventional imaging sensors which are often complex, bulky, heavy, and expensive (e.g., large aperture telescopes having lenses and/or mirrors). Such conventional optics are capable of providing high resolution images of the projectiles but often have a very narrow field of view (FOV), for example, under one degree.

Ballistic missile launch detection is often done from aircraft in order to locate launch sites. Conventional launch sensors are typically positioned on large aircraft in order to accommodate the size and weight of the launch sensors. However, the use of large aircraft for launch detection in military applications is undesirable due to the easy detection of such aircraft by enemies. Furthermore, due to the narrow field of view of the conventional launch sensors, the large aircraft typically perform launch detection from very large stand-off distances. Such large distances may compromise the ability of the conventional launch sensor to accurately detect all of the projectiles launched by the enemy. Thus, conventional launch sensors have significant drawbacks in launch detection.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 1 is a side cutaway view of an exemplary fiber optic directional sensor in accordance with the present disclosure.

FIG. 2 is a perspective view of another exemplary fiber optic directional sensor in accordance with the present disclosure.

FIG. 3 is a top view of the fiber optic directional sensor of FIG. 2.

FIG. 4 is a side view of the fiber optic directional sensor of FIG. 2.

DETAILED DESCRIPTION

Figure 5:
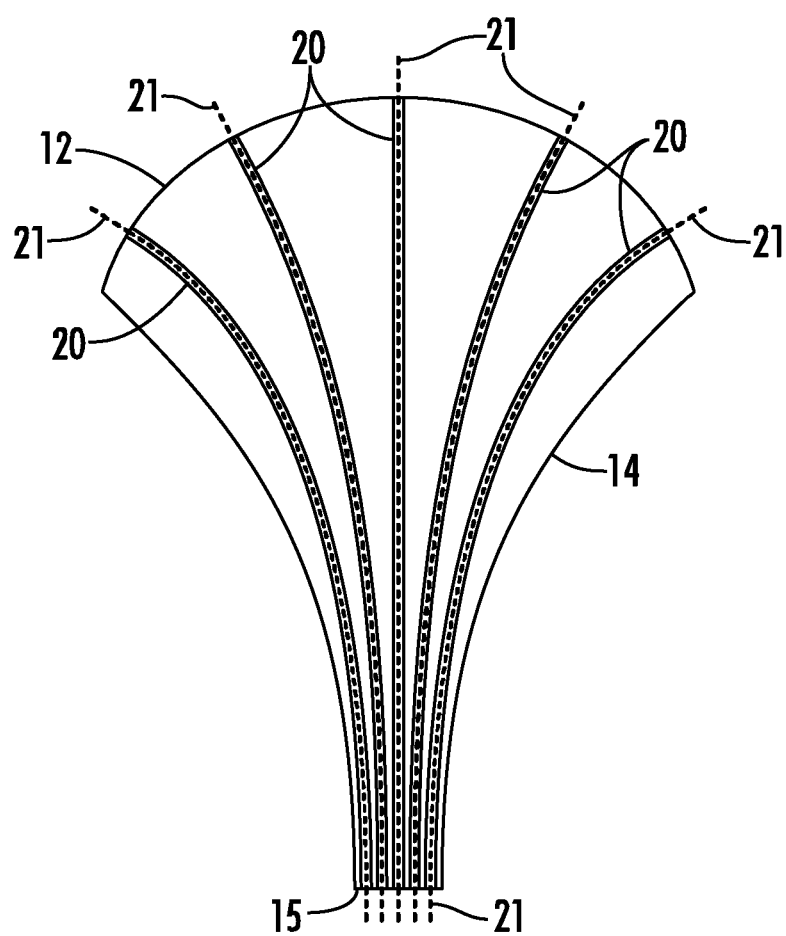
FIG. 5 is a side cutaway view of the fiber optic directional sensor of FIG. 2 depicting optical fibers within the sensor.

Embodiments of the present disclosure generally pertain to fiber optic directional sensors. An exemplary fiber optic directional sensor comprises a substantially hemispherical dome surface and a substantially flat surface. The sensor is formed from a plurality of optical fibers fused to one another. Each optical fiber extends from the dome surface to the flat surface. One end of each optical fiber is substantially perpendicular to the sensor's dome surface, and the opposite end of the fiber is substantially perpendicular to the sensor's flat surface such that an end face of the fiber is substantially tangent to the dome surface, and another end face of the fiber is substantially tangent to the flat surface. The sensor further includes an optical element joined to the domes surface for expanding the field of view of the sensor.

FIG. 1 depicts an exemplary embodiment of a fiber optic directional sensor 5. The sensor 5 comprises a dome surface 6 and a flat surface 7. As shown by FIG. 1, the dome surface 6 is substantially hemispherical. The sensor 5 comprises a plurality of optical fibers 8 extending from the dome surface 6 to the flat surface 7. FIG. 1 depicts only five optical fibers 8 for illustrative purposes, but the sensor 5 may comprise a large number (e.g., millions) of fibers 8. In one embodiment, the fibers 8 comprise glass, but other materials are possible in other embodiments. The fibers 8 may be fused to one another in a manufacturing process, described in more detail hereafter, in order to form the sensor 5.

Each optical fiber 8 extends from a point on the dome surface 6 to a corresponding point on the flat surface 7. Note that an end face (not shown) of each optical fiber 8 forms a part of the dome surface 6 such that a centerline 9 running along the fiber 8 is substantially perpendicular to the dome surface 6 at the end face. Another end face (not shown) of the fiber 8 forms a part of the flat surface 7 such that the centerline 9 running along the fiber 8 is substantially perpendicular to the flat surface 7 at such end face. In this regard, the opposing end faces of each optical fiber 8 are substantially flat and substantially perpendicular to the centerline 9 running along the fiber 8. Thus, one end face of each fiber 8 is substantially tangent to the dome surface 6 such that an angle between the centerline 9 and the surface 6 is approximately 90 degrees, and the other end of the fiber 8 is substantially tangent to the flat surface 7 such that an angle between the centerline 9 and the surface 7 is approximately 90 degrees. Accordingly, each fiber 8 has a narrow FOV that makes up a portion of the entire, broad FOV for the sensor 5. Note that FIG. 1 shows a narrow FOV for one of the fibers 8. Each of the other fibers 8 would similarly have a narrow FOV extending along a centerline 9 of the respective fiber's core. The FOV may be increased by use of additional optical elements, as will be described in more detail hereinafter.

The narrow FOV for each fiber 8 corresponds to a particular azimuth and elevation. In this regard, any light detected by a particular fiber 8 at the dome surface 6 is propagated through the fiber 8 to the flat surface 7. Based on the position of the light on the flat surface 7, the azimuth and elevation of the light with respect to the sensor 5 can be determined, as will be discussed in more detail hereafter.

FIG. 2 depicts another exemplary embodiment of a fiber optic directional sensor 10. The sensor is configured to detect objects and to indicate a direction in which the objects are detected, as will be discussed in more detail hereafter. In one embodiment, the sensor 10 is configured for use in launch detection of projectiles, such as, for example, missiles, rocket-propelled grenades (RPGs), or muzzle flashes (e.g., from .50-caliber rifles), but other applications are possible in other embodiments. As shown by FIG. 2, the sensor 10 comprises a substantially hemispherical dome surface 12 and a tapered neck 14. The neck 14 extends downwardly from a peripheral edge of the dome surface 12 and tapers inwardly to a peripheral edge of a substantially flat surface 15. In this regard, a diameter of the dome surface 12 is sufficiently greater than a diameter of the flat surface 15 such that the neck 14 tapers inwardly as the neck 14 extends from the peripheral edge of the dome surface 12 to the peripheral edge of the flat surface 15. In one embodiment, a diameter of the dome surface 12 is approximately 26 millimeters (mm), and a diameter of the flat surface is approximately 5 mm. Furthermore, in one embodiment, a length of the sensor 10 from a top of the dome surface 12 to the flat surface 15 is approximately 35 mm. However, other dimensions are possible in other embodiments. The sensor 10 comprises a plurality of optical fibers (not shown in FIG. 2) fused to one another, as will be discussed in more detail hereafter. In one embodiment, the sensor 10 comprises glass, although different materials are possible in other embodiments.

Each optical fiber has a narrow field of view (FOV) in which the fiber can detect light, as will be discussed in more detail hereafter. The FOV may be increased by use of additional optical elements, as will be described in more detail hereafter. In this regard, an end face (not shown in FIG. 2) of each fiber forms a part of the dome surface 12 and makes up a small portion of a total FOV for the dome surface 12. Due to the substantially hemispherical shape of the dome surface 12, the total FOV for the sensor 10 is relatively large. In one embodiment, the total FOV for the dome surface 12 is approximately 90 degrees (e.g., plus or minus approximately 45 degrees), but different FOVs are possible in other embodiments.

The sensor 10 is relatively small and lightweight thereby enabling launch detection from small aircraft, such as, for example, unmanned air vehicles (UAVs). In this regard, the aircraft can perform launch detection from close stand-off distances as opposed to the long stand-off distances typically used for the large aircraft carrying conventional launch sensors (not shown). Furthermore, the relatively large FOV of the sensor 10 as compared to the small FOV of conventional launch sensors allows the sensor 10 to detect objects in a wide range of directions. The use of additional optical elements further increases the FOV of the sensor 10, as will be described in more detail hereinafter. Also, a plurality of sensors 10 may be positioned on the aircraft in order to enable simultaneous launch detection of a plurality of different types of objects, as will be discussed in more detail hereafter.

FIG. 3 depicts a top view of the fiber optic directional sensor 10 of FIG. 2. As shown by FIG. 3, the dome surface 12 is substantially circular and convex. As set forth above, the convex shape of the dome surface 12 allows the sensor 10 to have a relatively large FOV as compared to conventional launch sensors (not shown). In one embodiment, the sensor 10 has a field of view of plus-or-minus approximately 45 degrees, but other FOVs are possible in other embodiments. Thus, the sensor 10 detects light from a wide area and automatically indicates the direction from which the light was received based on which optical fibers (not shown in FIG. 3) detected the light, as will be discussed in more detail hereafter. Furthermore, the sensor 10 may simultaneously detect light from multiple bright objects and automatically indicate the direction of the light from each object.

FIG. 4 depicts a side view of the sensor 10 of FIG. 2. The sensor 10 comprises the dome surface 12, the tapered neck 14, and the flat surface 15, as set forth above. A perimeter of flat surface 15 is substantially circular, and the neck 14 gradually tapers from a peripheral edge of the dome surface 12 to a peripheral edge of the flat surface 15. As shown by FIG. 4, a diameter of the dome surface 12 is significantly larger than a diameter of the flat surface such that light received through the relatively large dome surface 12 is transferred to the smaller flat surface 15 via the neck 14 and is thereby easier to analyze, as will be discussed in more detail hereafter. In this regard, the sensor 10 receives light through the dome surface 12 and optical fibers (not shown in FIG. 4) within the sensor 10 guide the light from the dome surface 12 to the flat surface 15. Thus, the sensor 10 receives light from a broad area via the dome surface 12 and the light is automatically transferred to the flat surface 15 via the optical fibers.

FIG. 5 depicts a cutaway view of the sensor 10 of FIG. 2. The sensor 10 comprises a plurality of optical fibers 20 extending from the dome surface 12 to the flat surface 15. FIG. 5 depicts only five optical fibers 20 for illustrative purposes, but the sensor 10 typically comprises a large number of fibers 20. Indeed, in one embodiment, a large number of optical fibers 20 (e.g., about 2.8 million) are fused together in a manufacturing process, such as, for example, a conventional multi-fiber drawing process, as will be described in more detail hereafter, to form the dome-shaped sensor 10 depicted by FIGS. 1-4. However, other numbers of fibers 20 are possible in other embodiments.

Each optical fiber 20 extends from a point on the dome surface 12 to a corresponding point on the flat surface 15. Note that an end face (not shown in FIG. 5) of each optical fiber 20 forms a part of the dome surface 12 such that a centerline 21 running along the fiber 20 is substantially perpendicular to the dome surface 12 at the end face. Furthermore, another end face (not shown in FIG. 5) of the fiber 20 forms a part of the flat surface 15 such that the centerline 21 running along the fiber 20 is substantially perpendicular to the flat surface 15 at such end face. In this regard, the opposing end faces of each optical fiber 20 are substantially flat and substantially perpendicular to the centerline 21 running along the fiber 20. Thus, one end face of each fiber 20 is substantially tangent to the dome surface 12 such that an angle between the centerline 21 and the surface 12 is approximately 90 degrees, and the other end of the fiber 20 is substantially tangent to the flat surface 15 such that an angle between the centerline 21 and the surface 15 is approximately 90 degrees. Accordingly, each fiber 20 has a narrow FOV that makes up a portion of the entire FOV for the sensor 12. The FOV may be increased by use of additional optical elements, as will be described in more detail hereinafter. In the instant embodiment, light from a projectile is incident on the ends of a plurality of contiguous fibers 20, and each such fiber 20 carries a respective portion of the light to a respective area of the flat surface 15. As an example, the light may appear as a dot on the flat surface 15, and the location of such dot within the flat surface 15 indicates the projectile's direction from the sensor 12, as will be described in more detail below. Note that a large number of the fibers 20 are curved such that the respective centerlines 21 are perpendicular to the respective surfaces 12 and 15.

The narrow FOV for each optical fiber 20 corresponds to a particular azimuth and elevation. In this regard, any light detected by a particular optical fiber 20 is received through the dome surface 12 and propagated through the fiber 20 to the flat surface 15. Based on the location of the light on the flat surface 15, the azimuth and elevation of the light with respect to the sensor 10 can be determined. More than one fiber 20 may detect the light, but the light may be brightest in the fiber 20 whose FOV is aimed most directly at the light. The azimuth and elevation for the light may be determined based on which fiber or fibers 20 transmit the brightest light, as will be discussed in more detail hereafter. Thus, the sensor 10 detects light emitted by objects and automatically indicates the direction from which the light is detected based on which optical fibers 20 received the light. Furthermore, if the light moves with respect to the sensor 10, the light is detected by one or more different optical fibers 20 in the sensor 10 which correspond to different narrow FOVs (e.g., different azimuth and elevation). Accordingly, the sensor 10 automatically tracks the movement of the light based on which optical fibers 20 detect the light over time.

In one embodiment, each optical fiber 20 comprises glass, but other materials are possible in other embodiments. Each optical fiber 20 comprises a core (not shown in FIG. 5) and cladding (not shown in FIG. 5), discussed in more detail hereafter. The optical fibers 20 are fused to one another to form the sensor 10, as will be discussed in more detail hereafter. Thus, the sensor 10 comprises the fused fibers 20 wherein each fiber 20 extends from the dome surface 12 to the flat surface 15.

Figure 6:
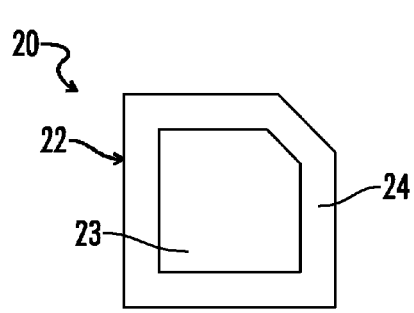
FIG. 6 is an end view of an exemplary optical fiber, such as is depicted by FIG. 5.

FIG. 6 depicts an end face 22 of an optical fiber 20. As set forth above, the fiber 20 has two end faces 22 such that one end face 22 forms a portion of the dome surface 12 (FIG. 2) and the other end face 22 forms a portion of the flat surface 15 (FIG. 2). In one embodiment, the fiber 20 is five-sided, but other shapes are possible in other embodiments. Each fiber 20 comprises a core 23 and cladding 24. In this regard, the core 23 is dimensioned to fit within the cladding 24. In one embodiment, the cladding 24 is pre-fabricated and the core 23 is inserted into the cladding 24 such that the core 23 fits tightly within the cladding 24. However, other methods for forming the fiber 20 are possible in other embodiments.

The core 23 is configured to propagate light received by the fiber 20, and the cladding 24 is configured to reflect the light such that light is guided through the core 23 from one end face 22 of the fiber 20 to the other.

The fiber 20 has an instantaneous, narrow FOV such that light entering the FOV is propagated along the fiber 20 to the flat surface 15. The fiber 20 corresponds to a specific direction (e.g., azimuth and elevation), and light detected by the fiber 20 indicates the specific direction of the light, as set forth above. As a whole, a plurality of the fibers 20 transfers the light incident to the dome surface 12 to the flat surface 15, and each fiber 20 of the plurality carries a respective portion of such light. Since the area of the flat surface 15 is smaller than that of the dome surface 12, the size of the light at the flat surface 15 is reduced in proportion to the ratio of the surface areas.

Figure 7:
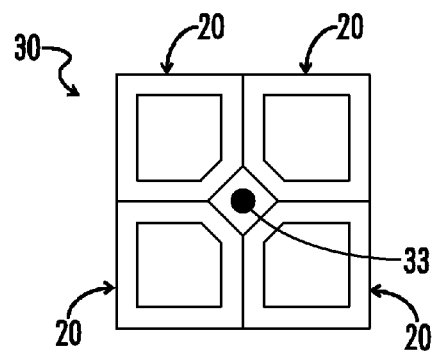
FIG. 7 is an end view of an exemplary bundle of a plurality of optical fibers.

FIG. 7 depicts a bundle 30 of optical fibers 20. In one embodiment, the bundle 30 comprises four optical fibers 20 and an interstitial rod 33 between the fibers, but different numbers of optical fibers 20 are possible in other embodiments. As shown by FIG. 7, the fibers 20 are positioned in a square bundle 30 and the rod 33 is positioned in a space between the fibers 20. The rod 33 is configured to absorb stray light from the fibers 20 such that the stray light is not transmitted to the other fibers 20 thereby reducing crosstalk between the fibers 20. In this regard, stray light from one fiber 20 may be transmitted to one or more other fibers 20 in the bundle 30 thereby reducing the ability of the sensor 10 (FIG. 2) to accurately detect the direction of the light. In one embodiment, the rod 33 comprises black glass configured to absorb stray light, but different materials are possible in other embodiments. Thus, the rod 33 absorbs the stray light and increases the accuracy of the detections made by the sensor 10.

In one embodiment, a plurality of fibers 20, such as for example, approximately 10-12 fibers 20, on the flat surface 15 (FIG. 2) correspond to a pixel of a light sensing apparatus (not shown in FIG. 7), discussed in more detail hereafter. Thus, if one or more of such fibers 20 detect light above a threshold, the pixel indicates that light from a specific direction is detected.

Figure 8:
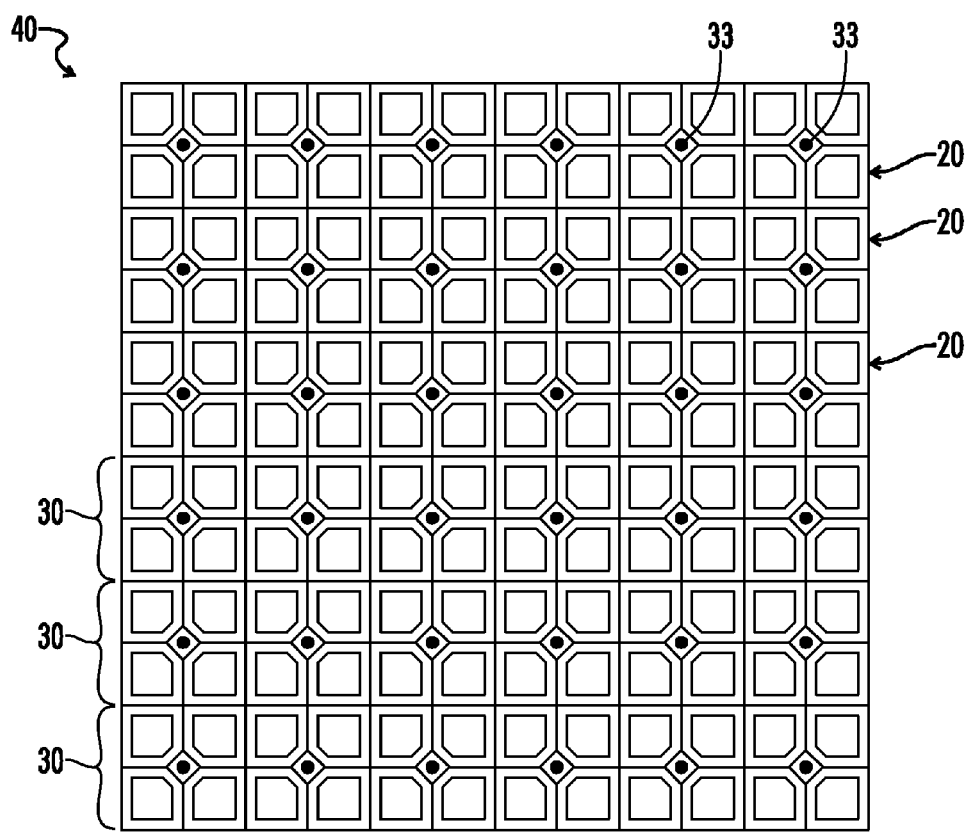
FIG. 8 is an end view of an array of optical fibers.

FIG. 8 depicts an array 40 of optical fibers 20. The array 40 comprises a plurality of bundles 30 of optical fibers 20. The array 40 of FIG. 8 comprises bundles 30 and 144 fibers 20 for illustration, but different numbers of bundles 30 and fibers 20 are possible in other embodiments. For example, in one embodiment, the array 40 comprises approximately 700,000 bundles and approximately 2.8 million fibers 20. The array 40 spans the entire flat surface 15 and the entire dome surface 12. In this regard, each fiber 20 gradually decreases in area as it approaches the flat surface 15 such that there is a 1:1 ratio of fibers 20 contacting the flat surface 15 to fibers 20 contacting the dome surface 12. As set forth above, each fiber 20 has a narrow FOV, and each narrow FOV makes up a portion of the total FOV for the array 40. Thus, the array 40 covers a wide area, and light from objects in the FOV of the array 40 is detected by the sensor 10.

Figure 16A:
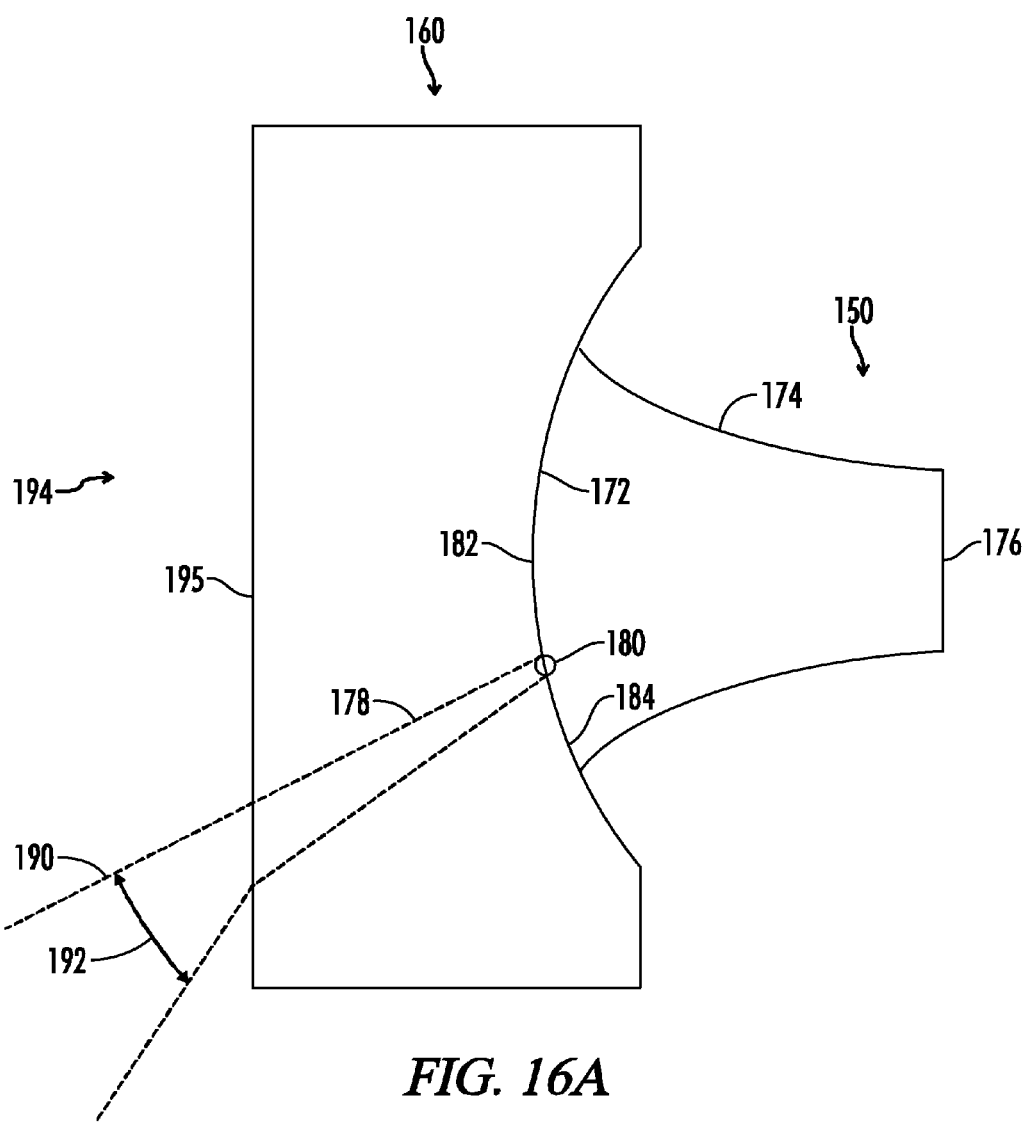
FIG. 16A is a side cutaway view of an exemplary fiber optic directional sensor with a field expanding optical element in accordance with the present disclosure.

The sensor 10 described with reference to FIGS. 2-4 may be unable to achieve a full hemispherical (i.e., 180 degree) FOV due to the physical constraints of its construction. As a result, the sensor 10 may be limited to a finite angle of FOV, for instance about 90 degrees. FIG. 16A depicts an exemplary embodiment of a fiber optic directional sensor 150 with an attached FOV expanding element 160. Optical element 160 expands the FOV such that the sensor 150 provides a complete hemispherical view, or beyond a hemispherical view. As shown by FIG. 16A, sensor 150 comprises a substantially hemispherical domed surface 172 and a tapered neck 174. The neck 174 extends downwardly from a peripheral edge of the domed surface 172 and tapers inwardly to a peripheral edge of a substantially flat surface 176. The configuration and dimensions of sensor 150 may be similar or identical to those described above in reference to FIG. 2. The sensor 160 comprises a series of optical fibers (not shown in FIG. 16A) fused to one another, as will further described herein. In this regard, an end face 180 of each fiber forms part of the dome surface 172 and makes up a small portion of the total FOV for the domed surface 172. Each optical fiber collects a narrow cone of light (the FOV) 178 which is oriented normal to the surface 184 of the sensor 150. As a result, the end face 180 of each optical fiber acts as an array of point sources on the surface of the sensor 150.

In the embodiment illustrated in FIG. 16A, the element 160 is rectangular shaped in cross section with a hemispherical cut-out where it is joined to the sensor 150. Other shapes of optical elements 160 are possible in other embodiments. The shape of the elements 160 may be altered from that illustrated in FIG. 16A in order to alter the spectral and distortion properties of the sensor 150.

The optical element 160 is positioned such that it is within the path of light received by the optical fibers of the sensor 150. In one exemplary embodiment, optical element 160 comprises an inner concave surface 182, which corresponds to (e.g., matches) the spherical shape of the convex surface 184 of sensor 150. In this embodiment, the surface 182 of the element 160 is formed so that its radius is equal to the radius of the sensor 150. In one embodiment, the radius of the optical element 160 and sensor 150 is approximately 30 mm, although other sizes are possible in other embodiments. The element 160 abuts against the sensor 150 at its hemispherical surface so that it will not detach or otherwise break free of the sensor 150. The element 160 may be adhered to the sensor 150 by a number of methods as will be clear to one of skill in the art, for instance through the use of optical glues or cements.

As illustrated in FIG. 16A, a large beam of light 190 entering optical element 160 through side 194, which has a flat surface 195. FIG. 16A shows a field of view 192 for a single fiber of the sensor 150. The optical characteristics of the element 160, as will be described in more detail hereafter, have the effect of increasing the fiber's FOV relative to an embodiment in which the element 160 is not present. Although FIG. 16A shows the FOV for a single fiber, the optical element 160 similarly increases the fields of view of all of the fibers in sensor 150. Thus, each fiber of the sensor 150 should have a larger FOV relative to the embodiment described above for FIGS. 2-5 such that the overall FOV of the sensor 150 is larger.

The index of refraction of the optical element 160 is selected such that the beam of light 190 narrows as it travels through the flat surface 195 of element 160 to the concave surface 182. Element 160 narrows and focuses the beam 190 onto the end face 180 of the optical fiber, orthogonal to the convex surface 184 of the sensor. Specifically, the optical element 160 functions as a lens for focusing a larger beam of light 190 onto the fiber optic end face 180. Preferably, the element 160 focuses the light onto the end face 180 of an optical fiber with minimal aberration while maximizing FOV amplification. An element 160 in accordance with the embodiment of FIG. 16A has been shown to produce FOV of about 140 degrees. In this respect, the element 160 expands the available field of the sensor 150 beyond the physical limitations of the sensor's construction. In an additional embodiment, the element 160 may be configured such that only light having a certain range of wavelengths may pass through the element 160. This may be accomplished, for example, by coating the surfaces of element 160 with a material that allows a light of only a certain wavelength range to pass through the element 160, for instance a wavelength range associated with a RPG launch plume.

Figure 16B:
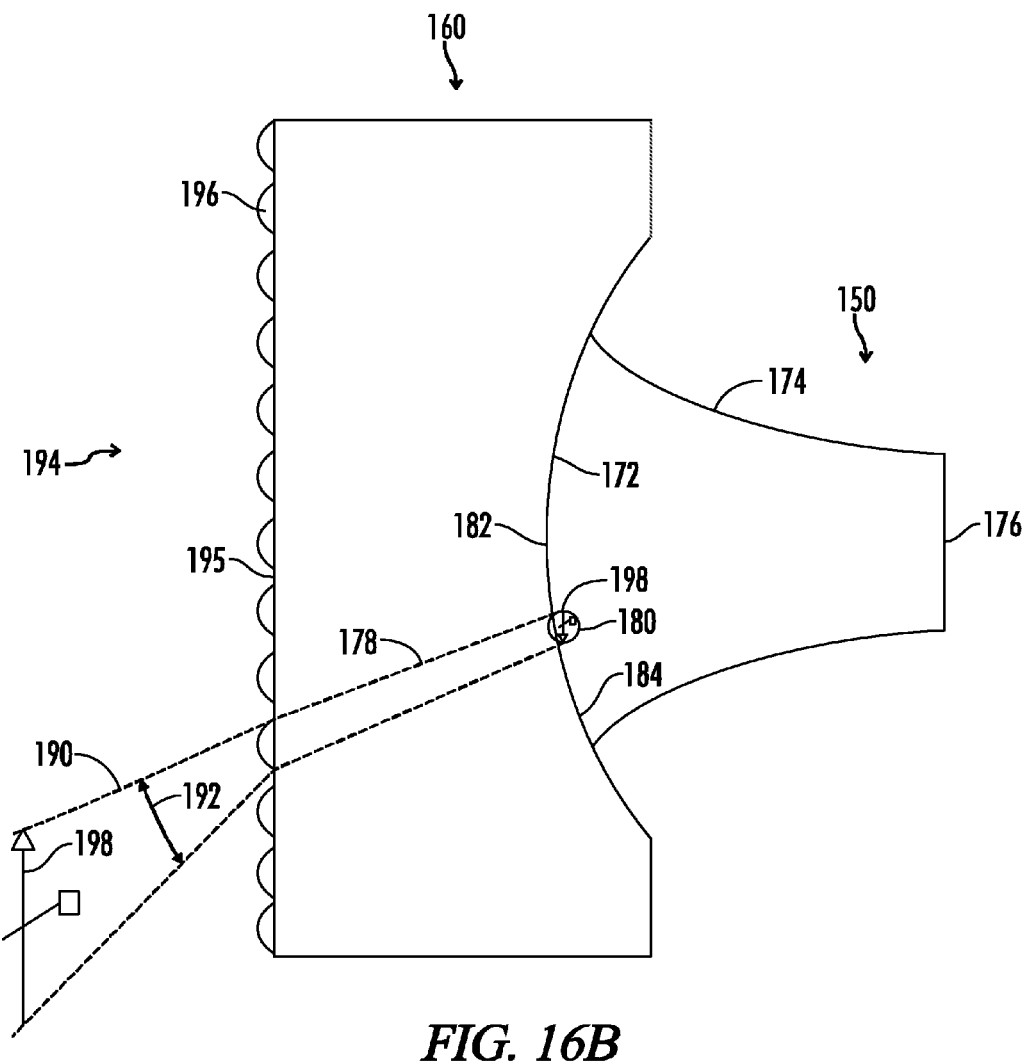
FIG. 16B is a side cutaway view of the sensor of FIG. 16A including a series of lenslets.
Figure 16C:
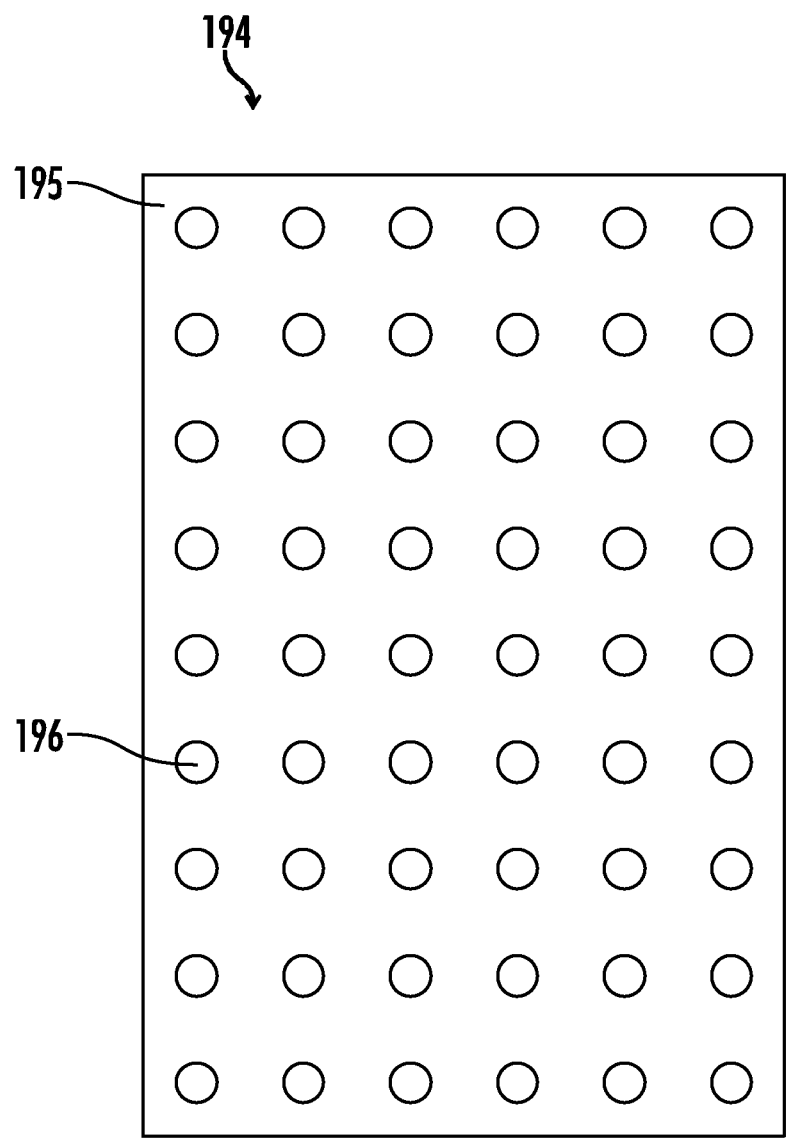
FIG. 16C is a front view of an exemplary optical element containing a series of lenslets.

FIG. 16B illustrates an additional embodiment of the optical element discussed above in reference to FIG. 16A. Here, one or more surfaces of the element 160 may include an array of small lenslets 196. FIG. 16C illustrates an embodiment of the sensor 160 with an array of lenslets placed on the flat surface 195 of side 194. The lenslets 196 cover the entire flat surface 195 of side 194. The lenslets 196 may be distributed on the flat surface 195 in a variety of ways, for instance in a rectangular pattern having aligned rows and columns of lenslets, as illustrated in FIG. 16C. Other patterns are possible in other embodiments, for instance a hexagonal or polar array. Each lenslet 196 comprises a small bump or protrusion extending outward from the flat surface 195. When a lenslet 196 is within the path of light from the object 198, the lenslet 196 forms an offset image of object 198 onto the end face 180 of at least one of the optical fibers of the sensor 150, resulting in the formation of a multitude of subimages (not shown). This collection of offset images may be processed to form a single image with higher resolution. These individual lenslets 196 may each comprise the same optical power, or focal length, or they may differ. In addition, the lenslets 196 may comprise non-imaging optics that concentrate light without producing an image.

Figure 17:
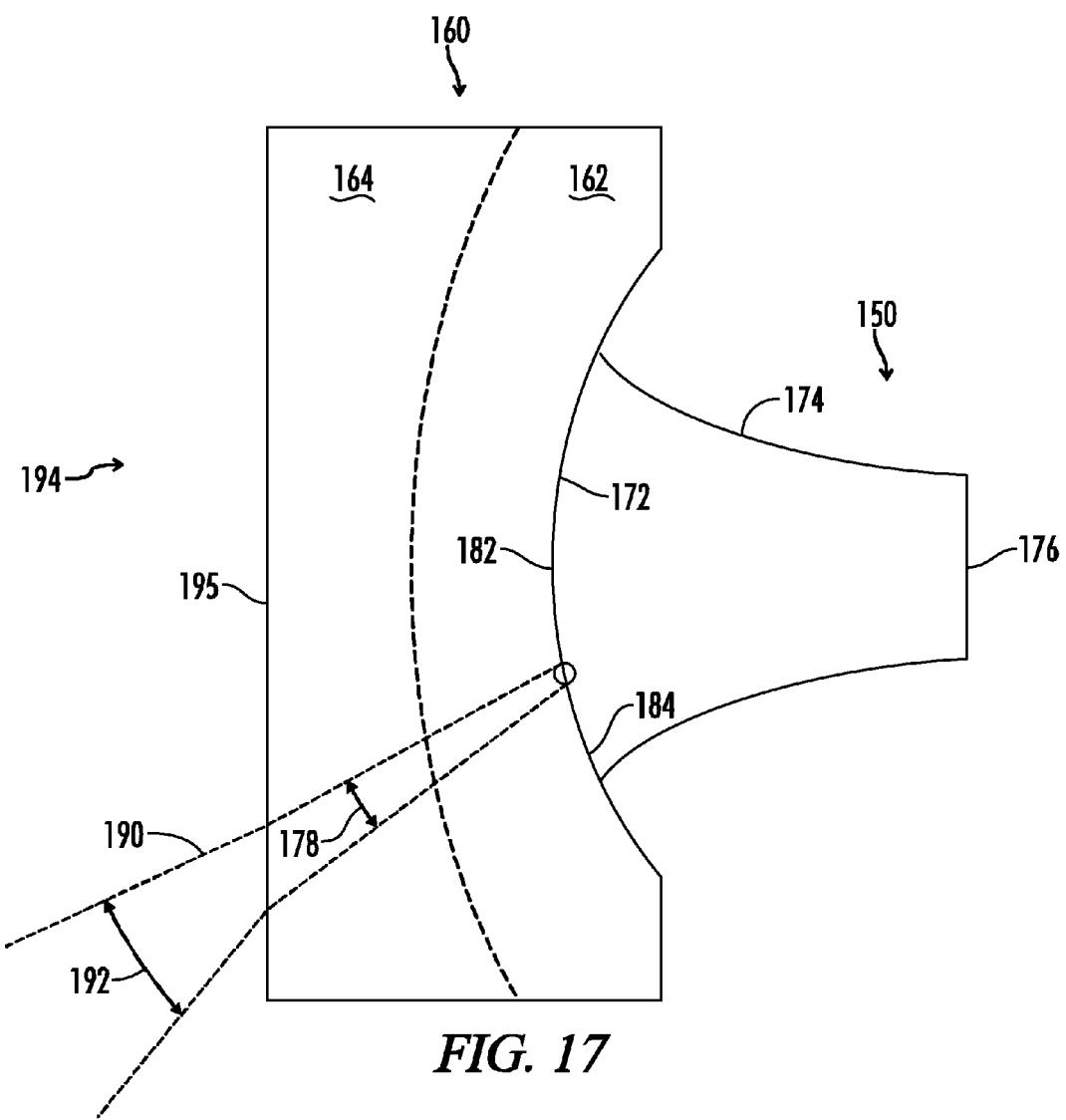
FIG. 17 is a side cutaway view of the sensor of FIG. 16A with two optical elements.

FIG. 17 illustrates an embodiment of an optical element 160 having two portions with different indices of refraction. Here, element 160 includes a first portion 162 and a second portion 164. The two portions 162 and 164 may be constructed from materials with different refractive indices. The use of different refractive indices allows for chromatic manipulation of the incoming light 190. In some cases, the portions 162 and 164 may be configured to alter the distortion of the incoming light. The light exiting the element 160 (FIG. 16) may be chromatically aberrated. This aberration is caused by the inability of a single lens to focus light of all wavelengths onto a common convergence point. In this regard, each color of wide optical spectrum cannot generally be focused onto a single common focal point by a single lens. Because the portions 162 and 164 have different dispersions, the portions 162 and 164 may act together to simultaneously focus multiple wavelengths onto the end face 180 of an optical fiber. Conversely, the materials used to construct portions 162 and 164 may be chosen to expand the dispersion, similar to a spectrometer. This may also be accomplished by creating a diffraction grating on the surface of element 160. As a result, chromatic manipulation of the light entering sensor 150 may be chromatically controlled through the selection of the components of portions 162 and 164. In the instant embodiment, each portion 162 and 164 functions as a respective lens having a different index of refraction such that each wavelength over a relatively wide bandwidth is focused at single common point at the end face 180 of an optical fiber.

Figure 18A:
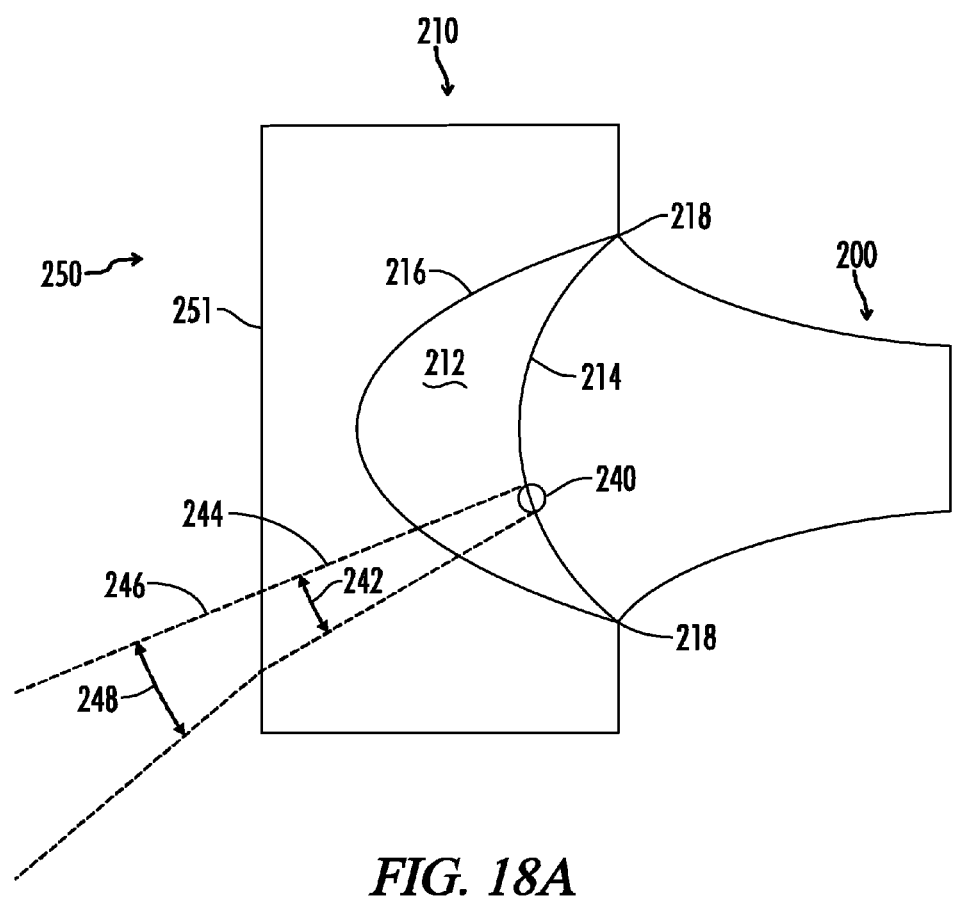
FIG. 18A is a side cutaway view of an exemplary fiber optic directional sensor with a field expanding optical element containing a sealed space.

FIG. 18A illustrates an additional embodiment of a fiber optic directional sensor 200 with an attached FOV expanding element 210. The sensor 200 described in FIG. 18A is configured as described above in reference to FIGS. 16A-16C and 17 except as otherwise described hereafter. In this embodiment, the element 210 is rectangular shaped in cross-section with a hemispherical cut-out. Other shapes of optical elements 210 are possible in other embodiments. The shape of the element 210 may be altered from that illustrated in FIG. 18A in order to alter its distortion and spectral properties. Here, the element 210 adhered to sensor 200 employs a concave surface 216 with a smaller radius of curvature as compared to the sensor convex surface 214. Element 210 functions as an edge contact element, where it contacts the sensor 200 only at the edge 218, which extends around the entire periphery of the sensor 200 forming circle, although other shapes are possible in other embodiments. Note that the element 210 may contact the edge 218 around the entire periphery of the edge 218 (i.e., at each point on the edge 218) thereby sealing the space 212. Edge 218 of element 200 may be adhered to the sensor 200 using glue, adhesives, or other substances as will be known to one of skill in the art. The difference in the size of the surfaces 214 and 216 results in a sealed space or area 212 where the surfaces 214 and 216 do not abut. This area 212 may be filled with a substance that will affect the optical characteristics of the light entering element 200. Such substances may include, as non-limiting examples, air, dry nitrogen or other gasses or an optical liquid. In an additional embodiment, the space 212 may form a sealed vacuum between the element 210 and the sensor 200.

An end face 240 of each fiber of the sensor 200 forms part of the dome surface 214 and makes up a small portion of the total FOV for the domed surface 214. Each optical fiber collects a narrow cone of light (the FOV) 242 which is positioned normal to the surface 214 of the sensor 200, thus creating an array of point sources on the surface 214. As illustrated in FIG. 18A, a large beam of light 246 entering optical element 210 through side 250 which has a flat surface 251. FIG. 18A shows a field of view 248 for a single fiber of sensor 200. The optical characteristics of the element 210, as will be described in more detail hereafter, have the effect of increasing the fiber's FOV relative to an embodiment in which the element 210 is not present. Although FIG. 18A shows the FOV for a single fiber, the optical element 210 similarly increases the fields of view of all the fibers in sensor 200. Thus, each fiber of the sensor 200 should have a larger FOV relative to the embodiment described above for FIGS. 2-5 such that the overall FOV of the sensor 200 is larger. In this respect, the element 210 and space 212 expand the available field of the sensor 200 beyond the physical limitations of its construction by increasing the FOV of the array of point sources on the surface of sensor 200.

Similar to the above discussion relating to FIG. 17, the fact that element 210 and the material present in space 212 are different results in these materials having different refractive indices. The different refractive indices allow for chromatic manipulation of the incoming light. As described above, the element 210 and the material in space 212 may be configured to alter the distortion of the incoming light. Conversely, the different materials comprising element 210 and present in space 212 may be chosen to expand the dispersion, similar to a spectrometer.

Figure 18B:
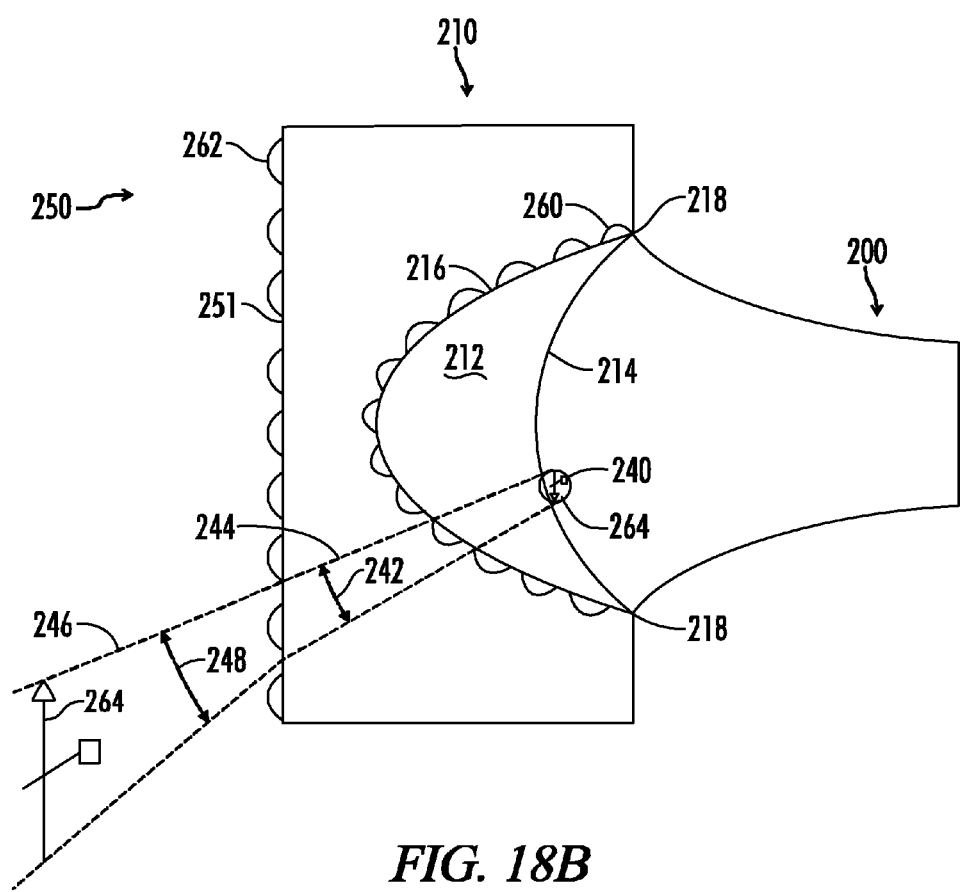
FIG. 18B is a side cutaway view of the sensor of FIG. 18A including a series of lenslets.

FIG. 18B illustrates an additional embodiment of the optical element 210 discussed above in reference to FIG. 18A. Here, one or more surfaces of the element 210 may include an array of small lenslets 260 and 262. The lenslets 260 may form small, lens-shaped indentations distributed across the concave surface 216 of element 210 in the same manner as described in reference to FIG. 16C. Lenslets 262 form a small bump or protrusion extending outward from the flat surface 251. Each of the lenslets 260 and 261 are configured and function in the same manner as lenslets 196 described above in reference to FIGS. 16B and 16C except as otherwise described.

Figure 19:
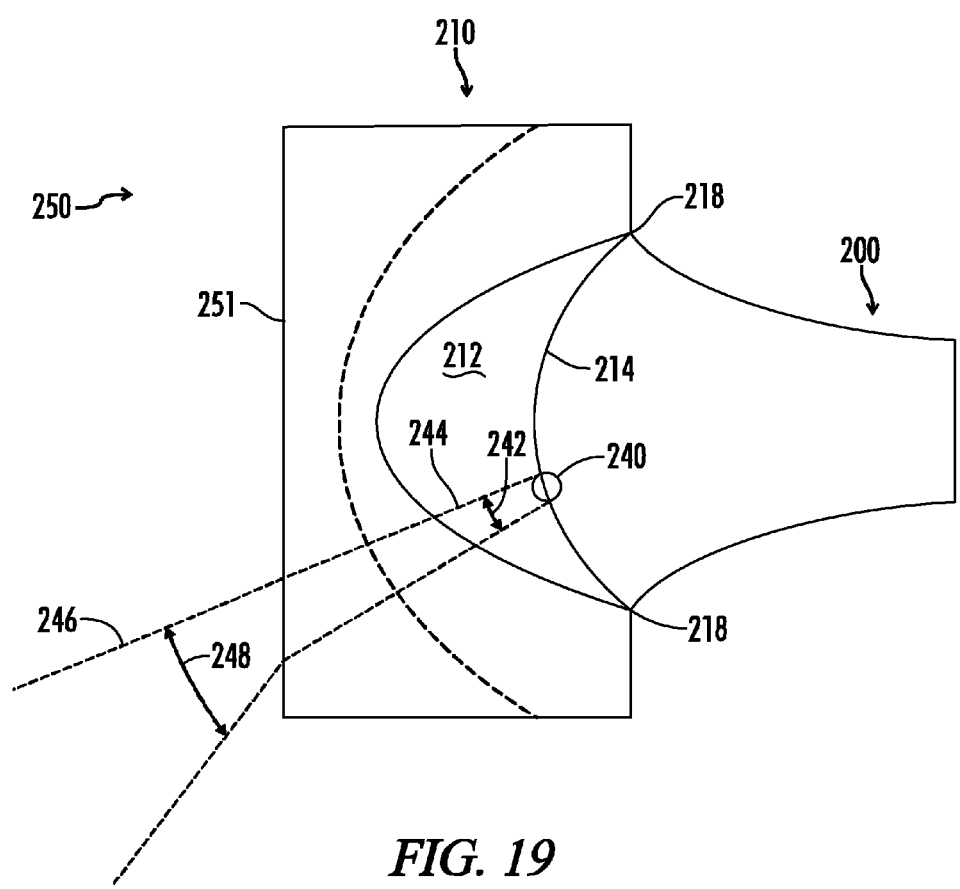
FIG. 19 is a side cutaway view of the sensor of FIG. 18A with two optical elements.

FIG. 19 illustrates an embodiment of the optical element 210 of FIG. 18. Here, element 210 includes a first optical element 218 and a second optical element 220. Similar to the optical element described with reference to FIG. 17, the two elements 218 and 220 may be constructed from materials with different refractive indices, allowing for chromatic manipulation of the incoming light 246. The elements 218 and 220 may be configured to alter the distortion of the incoming light 246. Any chromatic aberration observed with element 210 may be eliminated by utilizing materials with different refractive indices and differing dispersions. As a result, multiple wavelengths of light may be focused onto the ends of the optical fibers 240 at the same time. Conversely, the materials used to construct elements 220 and 218, as well as the material utilized to fill space 212 may be chosen to expand the dispersion, similar to a spectrometer. In an alternative embodiment, the optical element 210 could have a uniform index of refraction as described above for the embodiment described by FIG. 17. In yet other embodiments, an optical element 210 may have number of layers with different indices of refraction, or comprise material with a gradient refractive index as may be desired.

The embodiments described above utilize a series of optical elements to provide FOV magnification gains. For each fiber, the optical elements described above collect light from a wide FOV and focus this light onto an end face of the fiber. In addition, the use of multiple elements may alter the chromatic performance of the element, or the form and magnitude of the distortion of the incoming light. The use of multiple materials with differing refractive indices and dispersion qualities increases spectral control of the incoming light. In addition, the structure of the element surface may be altered, for instance a non-spherical surface, to offer more complex distortion, aberration and chromatic optical control.

Exemplary techniques for manufacturing a sensor 10 with an optical element according to an exemplary multi-fiber drawing process developed and/or implemented by Schott North America, Inc. will be described in more detail below.

Figure 9:
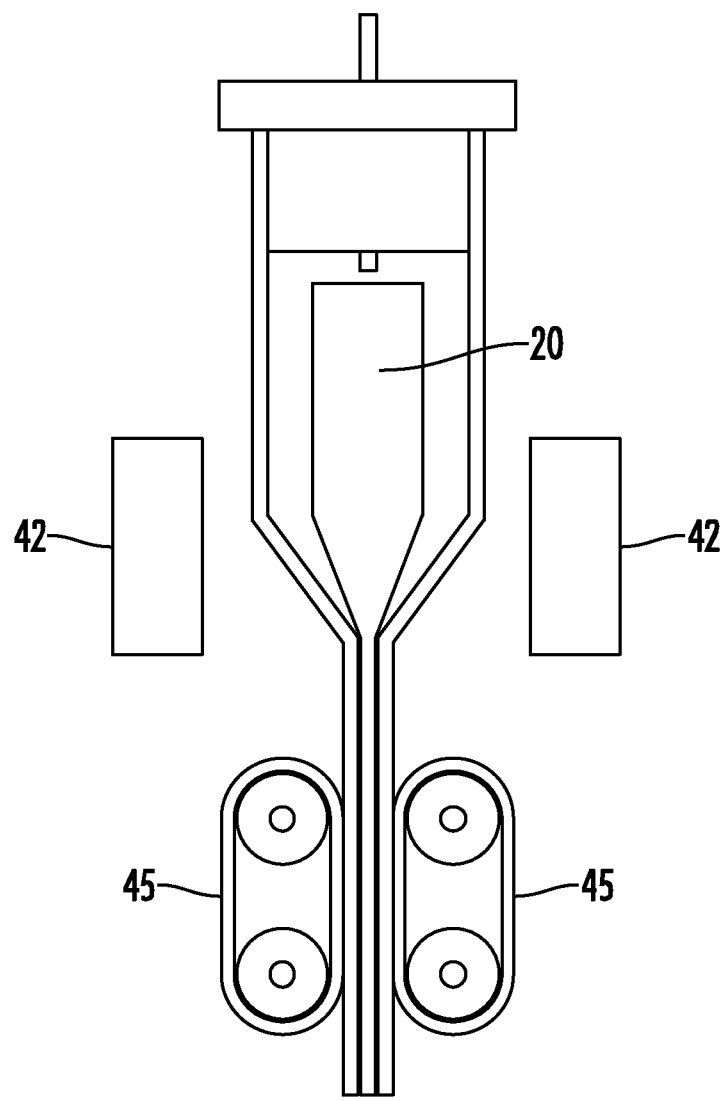
FIG. 9 is a side view of an optical fiber during the drawing process.

In this regard, FIG. 9 depicts a side view of an optical fiber 20 during a drawing process. Each optical fiber 20 is assembled individually, and the cross-section of the optical fiber 20 is initially much larger than the cross-section of the fiber 20 in its final form in the sensor 10 (FIG. 2). That is, the cross-section of each fiber 20 is decreased during manufacturing. In this regard, in one embodiment, the fiber 20 is fed into a furnace 42 and heated until the fiber 20 becomes soft. The fiber 20 is then drawn out of the furnace 42 via a pulling mechanism 45 at a relatively high speed, thereby drastically decreasing the cross-section of the fiber 20 while maintaining the shape. The fiber 20 is then cooled and hardened.

Once the fiber 20 is hardened after the initial drawing process, the fiber 20 is assembled into a stack (not shown) with a plurality of other fibers 20 and a plurality of rods 33 (FIG. 7). The assembled stack is then fed through the furnace 42 until the fibers 20 and rods 33 become soft. Once the fibers 20 and rods 33 become soft, they are drawn out of the furnace 42 at a relatively high speed by the pulling mechanism 45, as set forth above. The fibers 20 and rods 33 are fused to one another in the furnace 42 and the pulling mechanism 45 decreases the cross-section of the fibers 20 thereby forming a multi-fiber stack (not shown). The multi-fiber stack is then assembled into a larger stack (not shown) with a plurality of other multi-fiber stacks. This larger stack is fed through the furnace 42, the smaller stacks that have been assembled are fused to one another, and the fused multi-fiber stack are drawn out by the pulling mechanism 45 at a relatively high speed thereby decreasing the cross-section of the fibers 20 within the stack. This process is repeated until a block (not shown in FIG. 9) having a large number (e.g., hundreds of thousands or millions) of fused optical fibers 20 is formed. The block may then be formed into one or more sensors 10, as will be discussed in more detail hereafter.

Figure 10:
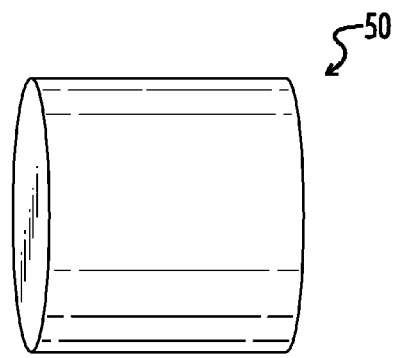
FIG. 10 is a side view of a block of fused optical fibers during the manufacture of a fiber optic directional sensor, such as is depicted by FIG. 2.
Figure 11:
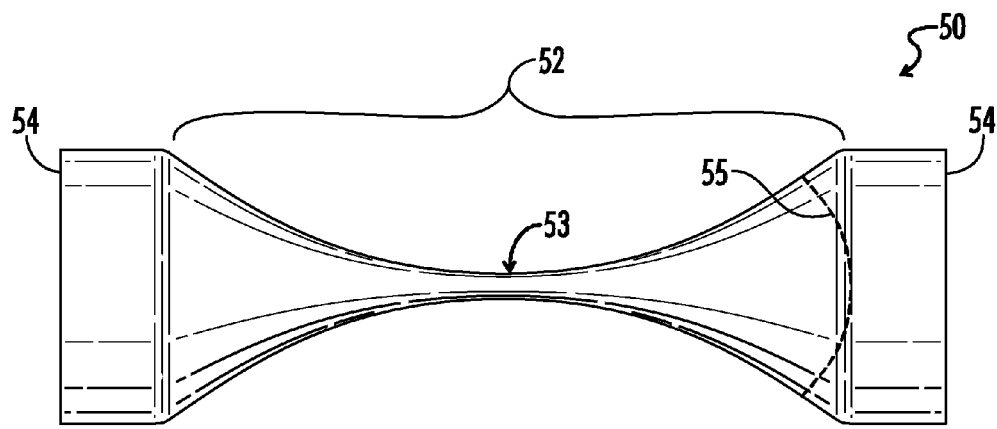
FIG. 11 is a side view of the block of FIG. 10 after the block has been stretched.

FIGS. 10 and 11 depict a block 50 of fused optical fibers 20 (FIG. 5) during the manufacturing process. Once an adequate number of optical fibers 20 are assembled, the fibers 20 are fused to one another to form the block 50, as set forth above. The block 50 comprises a plurality of substantially parallel optical fibers 20 extending from one end of the block 50 to another. In one embodiment, the block 50 may be formed into a cylindrical shape, as shown by FIG. 10. However, the block 50 may have other shapes, such as, for example, square or rectangular shapes, in other embodiments. Once the block 50 is formed into the desired shape, the block 50 is heated and gradually pulled apart at opposing ends 54 such that a tapered region 52 is formed in the middle of the block 50, as shown by FIG. 11. The tapered region 52 stretches and gradually tapers from the opposing ends 54 of the block such that a diameter of the tapered region 52 is smallest at its centermost point, and the diameter of the tapered region 52 increases as the tapered region 52 approaches the opposing ends 54 of the block 50.

Once the block 50 is stretched such that the tapered region 52 is formed, one or more sensors 10 (FIG. 2) may be formed from the block 50. For example, two sensors 10 may be formed from the block 50 shown in FIG. 11. In this regard, the sensors 10 may be formed from the tapered region 52 such that the neck 14 (FIG. 2) of each sensor 10 corresponds to a portion of the tapered region 52. The flat surface 15 (FIG. 2) of each sensor 10 is formed by cutting the block 50 near a center of the tapered region 52 at about point 53 in FIG. 11. Note that the flat surface 15 is substantially perpendicular to the centerline 21 (FIG. 5) of the optical fibers 20 (FIG. 5).

The dome surface 12 (FIG. 2) of each sensor 10 is also formed from the block 50. In this regard, the block 50 is cut in the tapered region 52 near one of the ends 54 such that the dome surface 12 corresponds to the dotted reference line 55 in FIG. 11 after grinding and polishing of the dome surface 12 are completed. The cutting, grinding, and polishing of the dome surface 12 are performed such that the centerline 21 of each optical fiber 20 is ultimately substantially perpendicular to the dome surface 12. Once the dome surface 12 and the flat surface 15 are cut for each sensor 10, any remains of the block 50 may be discarded.

After formation, the sensor 10 may be joined with one or more prepared optical element 160. The sensor 10 and element 160 are joined at their abutting surfaces through the use of, for example, an adhesive or glue. Other ways of joining the sensor 10 and element 160 are possible in other embodiments.

Figure 12:
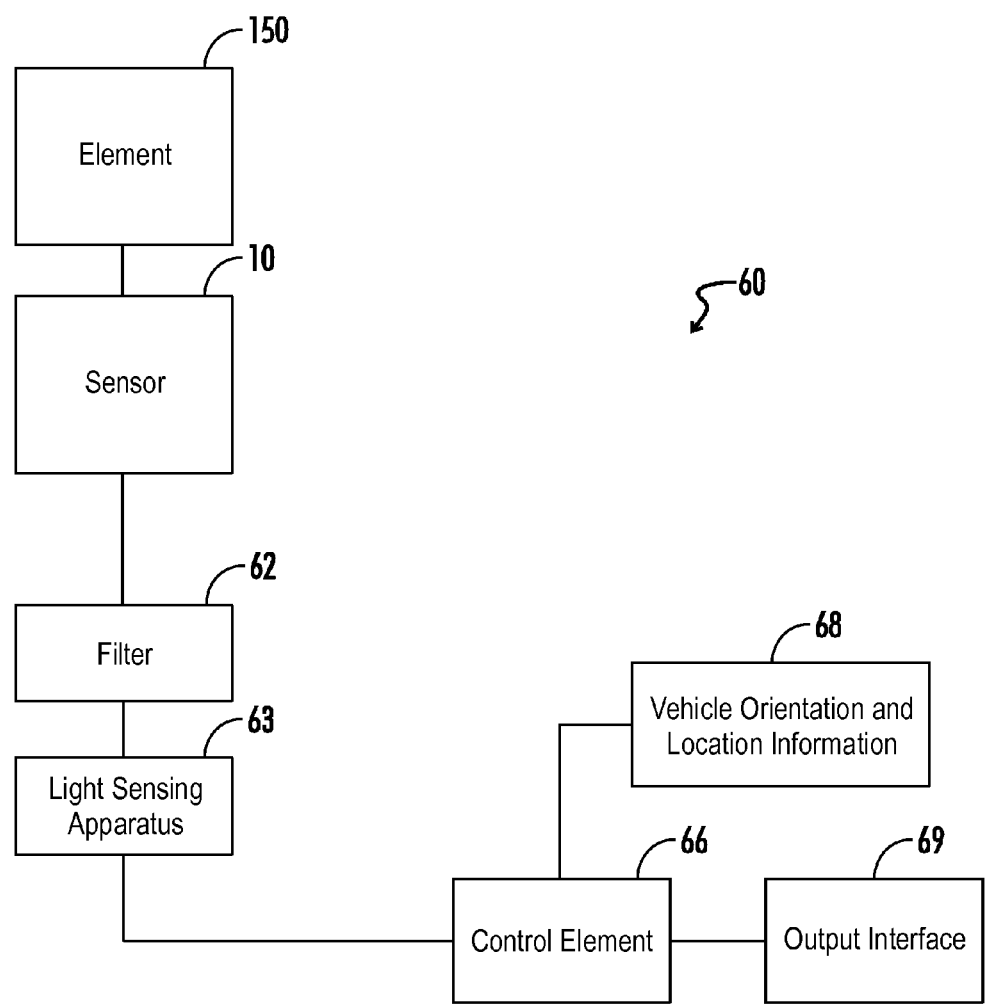
FIG. 12 is a block diagram depicting an exemplary fiber optic directional sensing system.

FIG. 12 depicts an exemplary embodiment of a fiber optic directional sensing system 60. The system 60 comprises an optical element 160, such as depicted in FIG. 16, and a fiber optic directional sensor 10, such as is depicted by FIG. 2. The system 60 further comprises a filter 62 and a light sensing apparatus 63. In one embodiment, the element 160 is adhered to the sensor 10. In an additional embodiment, the filter 62 abuts the flat surface 15 (FIG. 2) of the sensor 10 and the apparatus 63 abuts the filter 62. The filter 62 is configured to receive light passing through the element 160 and the sensor 10 and to filter the light such that only light having a certain wavelength is passed through the filter 62 to the light sensing apparatus 63. In this regard, light from a projectile, such as, for example, a missile, RPG, or .50-caliber rifle, may have a particular wavelength due to certain gases and substances released when such projectile is fired or propelled. Thus, for example, if directional sensing of missiles is desired, the filter 62 is configured to filter out other wavelengths of light such that the wavelength of light typically produced by the missile to be detected is isolated. Accordingly, any light passing through the sensor 10 that has the wavelength of light produced by the desired projectile is passed through the filter 62 to the light sensing apparatus 63.

The light sensing apparatus 63, such as, for example, a charge-coupled device (CCD) is configured to receive light from the filter 62 and to produce an output indicative of the brightness of the light. In one embodiment, the apparatus 63 comprises a plurality of pixels, and each pixel corresponds to a plurality of contiguous optical fibers 20 (FIG. 5) of the sensor 10. Light carried by a given fiber 20 illuminates its corresponding pixel. Thus, by determining which pixel or pixels sense light from an object, it can be determined which fibers 20 carry the light and, hence, the object's direction from the sensor 10 since each fiber is oriented in a specific direction at the dome surface 12.

In particular, as set forth above, each optical fiber 20 has an instantaneous, narrow FOV corresponding to a particular azimuth and elevation with respect to the sensor 10 and optical element 160. Thus, if the optical fibers 20 corresponding to a particular pixel carry light having a certain wavelength, the light will pass through the filter 62 to the apparatus 63 causing the apparatus 63 to sense the light and assign to the pixel a brightness value indicative of the measured brightness of the light for that pixel. The apparatus 63 then compares such brightness value to a predetermined threshold. If the brightness value exceeds the threshold, the apparatus 63 indicates that a bright object has been detected for the pixel. Furthermore, in one embodiment, if the brightness values of more than one contiguous pixels exceed the threshold, then the pixel or pixels having the highest brightness value correspond to the center of the object. Therefore, the apparatus 63 automatically indicates the direction of the object with respect to the sensor 10.

The system 60 further comprises a control element 66 coupled to the light sensing apparatus 63. The control element 66 is configured to receive the indication from the apparatus 63 and to produce an output signal indicative of the location of the object. In this regard, the direction of the object from the sensor 10 can be estimated based on which fibers 20 carry light from such object and, hence, which pixels of the apparatus 63 sense such light. Further, the distance of the object from the sensor 10 can be estimated based on the magnitude of the light source.

Note that the system 60 further comprises vehicle orientation and location information 68 and an output interface 69. In one embodiment, for example, the element 160 and sensor 10 are located on a vehicle, such as, for example, a UAV. The vehicle orientation and location information 68 indicates the vehicle's orientation and location relative to a geographical coordinate system in order to allow the control element 66 to determine the location of the object relative to such geographical coordinate system based on the indication from the apparatus 63. Thus, in one embodiment, the system 60 comprises an orientation sensor (not shown) and a global positioning system (not shown) for determining the precise orientation and location of the vehicle and providing the information 68. The control element 66 uses the vehicle orientation and location information 68 to determine the object's location relative to the geographical coordinate system.

In this regard, the control element 66 compares the azimuth and elevation of the object as detected by the sensor 10 with the orientation and location of the vehicle in order to determine the object's location relative to a geographical coordinate system. That is, the control element 66 translates the object's location from a coordinate system relative to the vehicle to a coordinate system relative to Earth. The logic 66 then transmits an output signal to the output interface 69 indicating the location of the object relative to Earth. In one embodiment, the output interface 69 displays a geographical map and indicates a spot on the map corresponding to the location of the object. However, different types of output interfaces 69 and output signals are possible in other embodiments. Accordingly, any object producing light of a desired wavelength is detected by the sensor 10 and transmitted to the output interface 69 in order to indicate the location of the object (e.g., azimuth and elevation) relative to a geographical coordinate system.

Note that the control element 66 may be implemented in hardware, software, firmware, or any combination thereof. In one exemplary embodiment, the control element 66 is implemented in software and stored in memory (not shown) of the system 60. In such embodiment, there may be a processing element (not shown), such as, for example, a digital signal processor (DSP) or central processing unit (CPU) for executing the control element 66.

Figure 13:
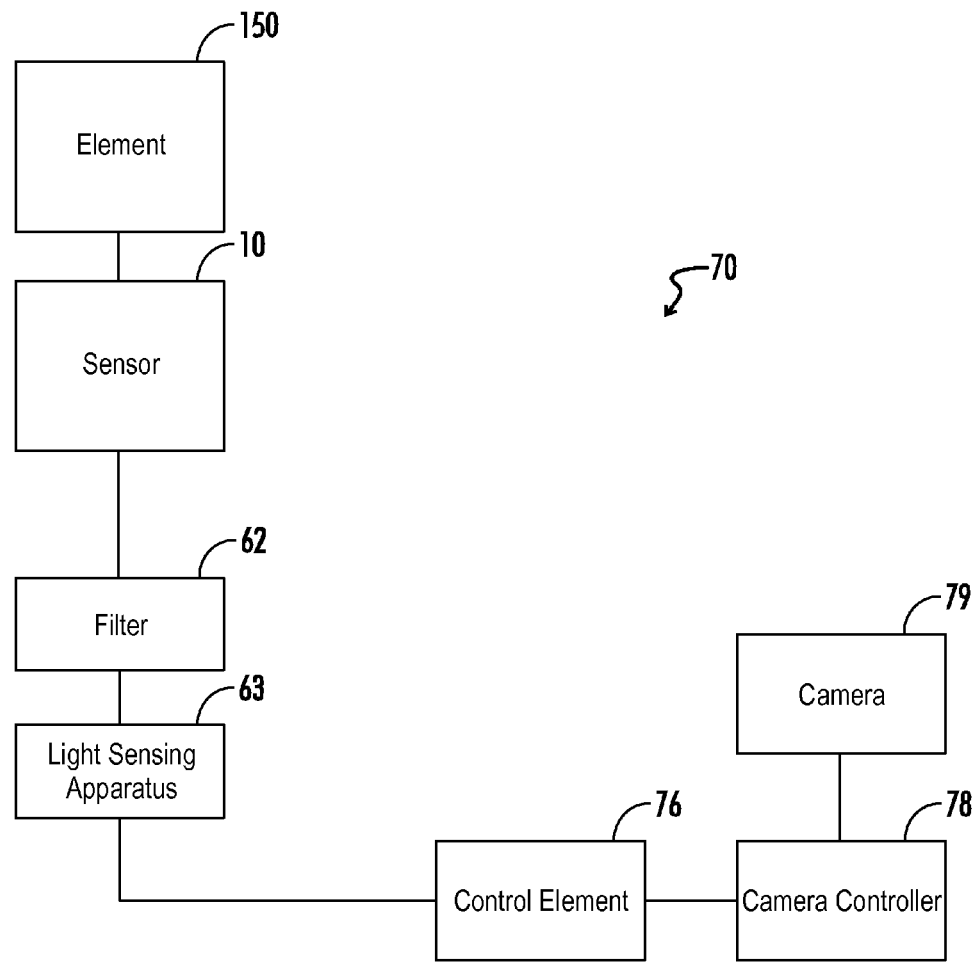
FIG. 13 is a block diagram depicting another exemplary fiber optic directional sensing system.

FIG. 13 depicts another exemplary embodiment of a fiber optic directional sensing system 70. The system 70 comprises an optical element 160, a sensor 10, a filter 62, and a light sensing apparatus 63. Note that the element 160, the sensor 10, the filter 62, and the apparatus 63 are configured and operate identically to the element 160, the sensor 10, the filter 62, and the apparatus 63 of FIG. 12, except as otherwise described herein. The system 70 further comprises a control element 76, a camera controller 78, and a camera 79. One or more of the optical fibers 20 (FIG. 5) of the sensor 10 detect light from an object which travels through the optical element and transmit the light to the filter 62. The filter 62 isolates light of a desired wavelength such that only light from a desired object type is passed to the apparatus 63. The apparatus 63 compares the brightness of the light to a threshold and provides an indication of the direction of the light with respect to the sensor 10. Such indication is transmitted to the control element 76.

The control element 76 receives the indication of the direction of the object from the apparatus 63 and controls the camera controller 78 and the camera 79 based upon the indication. In this regard, the sensor 10 does not capture a high resolution image of the object but only identifies bright light within the sensor's FOV. Thus, the sensor 10 may be utilized as a warning sensor in order to indicate objects of potential interest. Based on the indication from the apparatus 63, the control element 76 transmits a control signal to the camera controller 78 indicating the direction of the detected object such that the controller 78 aims the camera 79 in the direction of the object. The camera 79, such as, for example, a high-resolution digital camera, then captures images of the object such that a determination of the object's identity may be made. Accordingly, the sensor 10 acts as a warning sensor for the system 70, and the control element 76 automatically controls the camera 79 based on an indication of the object's location.

In one exemplary embodiment, assume that the element 160 and sensor 10 are implemented in a fiber optic directional sensing system 60. Further assume that the element 160 and sensor 10 are positioned upon a UAV, and the system 60 is configured to detect missiles. Further assume that the light sensing apparatus 63 comprises a CCD.

Figure 14:
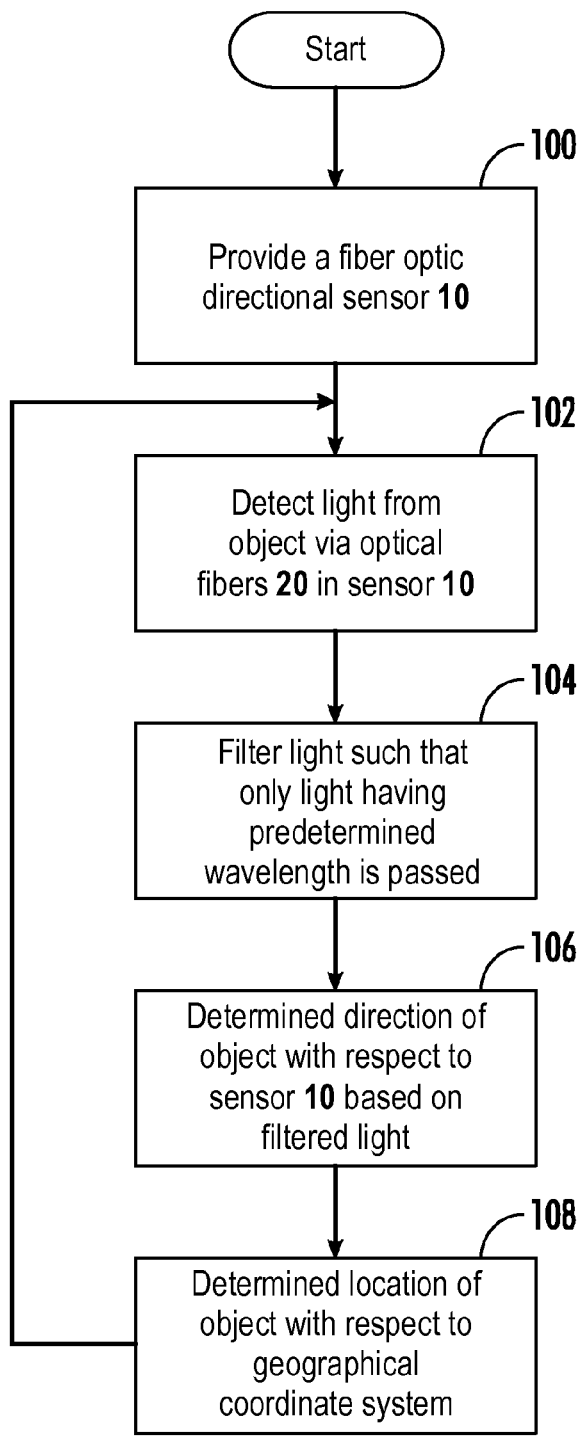
FIG. 14 is a flowchart illustrating an exemplary fiber optic directional sensing method.

The fiber optic directional sensor 10 and attached element 160 are positioned upon the UAV, as depicted by block 100 of FIG. 14, and coupled to the filter 62 and the CCD. The UAV then flies a desired course at a desired altitude, and the orientation and location of the UAV is stored in the vehicle orientation and location information 68. The information 68 is constantly tracked and updated in real time in order to provide accurate indications of the UAV's orientation and location. The sensor 10 constantly detects light entering the element 160 and the sensor's FOV and transmits such light to the filter 62, as shown by block 102. In this regard, each optical fiber 20 has a narrow FOV that makes up a portion of the total FOV for the sensor 10.

Figure 15:
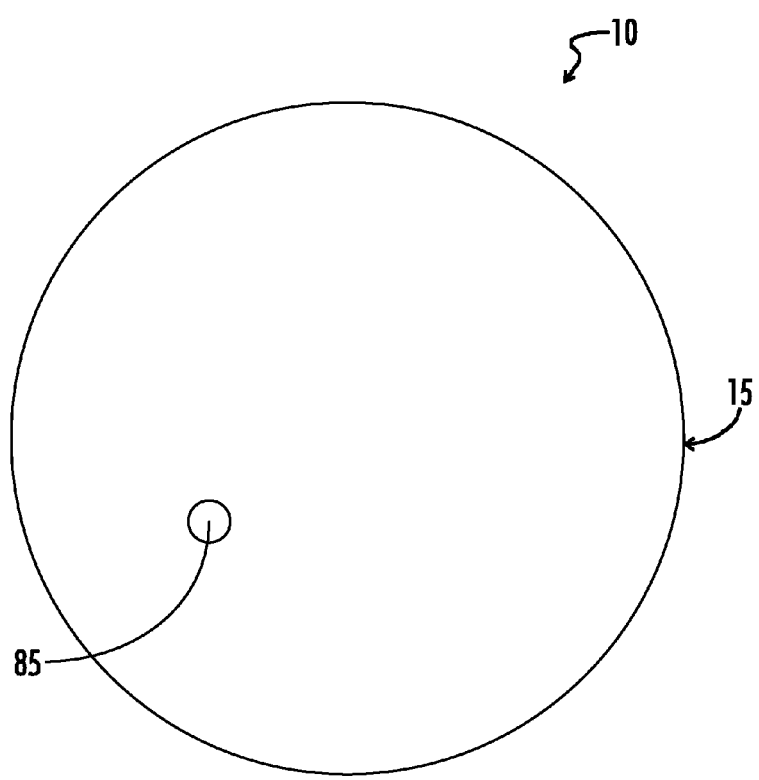
FIG. 15 depicts a bright spot on the flat surface of the sensor 10 of FIG. 2.

Now assume that a missile enters the FOV of a plurality of contiguous optical fibers 20. In this regard, and end face 22 of each of the contiguous fibers 20 is aimed at the missile while the end faces 22 of the other fibers 20 forming the dome surface 12 are not aimed at the missile due to the curvature of the dome surface 12. Light from the missile travels through the element 160 and is received by the contiguous fibers 20 at the dome surface 12 and transmitted through the fibers 20 to a corresponding location on the flat surface 15. In this regard, light from the missile is carried by the contiguous fibers 20 and forms a bright spot 85 on the flat surface 15, as shown by FIG. 15. The filter 62 receives the light from the sensor 10 and filters the light such that only light having the wavelength corresponding to the desired projectile passes through the filter 62, as shown by block 104 of FIG. 14. In this regard, the filter 62 allows wavelengths of light typically produced by missiles to pass through the filter 62 and blocks all other wavelengths of light such that only light having the same wavelength of light produced by missiles is allowed to pass. Such light is passed to the pixel or pixels of the CCD corresponding to the optical fibers 20 in the bright spot 85. Note that the filtering is optional, and it is possible for the filter 62 to allow a broader range of wavelengths to pass (e.g., wavelengths for multiple types of projectiles may be in the filter's passband).

The CCD receives the light from the bright spot 85 and measures a brightness of each pixel. The CCD provides an indication of the brightness of the pixels to the control element 66. The control element 66 compares the brightness of the light for each pixel to a predetermined threshold, and provides an indication of the direction of the light that exceeds the threshold, as shown by block 106. In this regard, the control element 66 determines whether the object (e.g., missile) is significant based on the brightness of the object. For example, if the object is not sufficiently bright, the object is likely not a missile or poses no serious threat. If the brightness of the object exceeds the threshold, the control element 66 determines that the object is likely a missile. As set forth above, the CCD comprises a plurality of pixels, and each pixel corresponds to one or more contiguous optical fibers 20 of the sensor 10 having a narrow FOV corresponding to a particular azimuth and elevation. If two or more contiguous pixels of the CCD exceed the threshold, the control element 66 may determine that all of the contiguous pixels are sensing light from the same missile, and the control element 66 identifies the brightest pixel as the missile's center. The azimuth and elevation for the missile is then determined based on the brightest pixel.

The control element 66 receives the indication from the CCD, compares the indication to the vehicle orientation and location information 68, and provides an output signal indicating the location of the missile with respect to a geographical coordinate system, as shown by block 108. Upon determining the location of the missile relative to the geographical coordinate system, the control element 66 transmits an output signal to the output interface 69 indicating such location of the missile. As set forth above, in one embodiment, the output interface 69 displays a geographical map and the output signal indicates a spot on the map corresponding to the location of the missile relative to the map. The output signal is constantly updated such that the output interface 69 indicates the location of the missile relative to the map in real time. Accordingly, the system 60 automatically detects and tracks the location of the missile with respect to a geographical coordinate system.

Now, therefore, the following is claimed:

1. A method, comprising:
providing a fiber optic directional sensor having a convex surface, the sensor having a plurality of optical fibers that have been fused together via heating, each of the optical fibers having an end face forming a respective portion of the convex surface;
receiving light from an object via at least one of the optical fibers;
passing the light through an optical element such that a field of view of the at least one optical fiber is expanded by the optical element, wherein the optical element comprises a concave surface positioned adjacent to the convex surface of the sensor; and
automatically determining a direction of the object from the sensor based on the received light.

2. The method of claim 1, further comprising:
filtering the light; and
determining the location of the object with respect to a geographical coordinate system based on the orientation and location of the sensor and the location of the object with respect to the sensor.

3. The method of claim 2, further comprising providing an output indicative of the location of the object with respect to the geographical coordinate system.

4. The method of claim 1, further comprising passing the light through a lenslet of the optical element.

5. The method of claim 1, wherein the passing comprises passing the light through a first portion and a second portion of the optical element, the first portion having a refractive index different than the second portion.

6. The method of claim 1, wherein the passing comprises passing the light through a sealed space defined by the optical element.

7. The method of claim 6, wherein a gas within the sealed space has a refractive index different than a refractive index of the optical element.

8. The method of claim 6, wherein the passing the light through the sealed space further comprises passing the light through a lenslet formed on a surface defining the sealed space.

9. The method of claim 1, further comprising filtering the light with the optical element thereby preventing at least some of the light within a specific wavelength range from reaching sensor.

10. A projectile sensing system, comprising:
a sensor for receiving light from a launched projectile, the sensor having a convex surface and a plurality of fused optical fibers that have been fused together via heating, each of the optical fibers having an end face forming a respective portion of the convex surface;
a light sensing apparatus positioned such that the light is received by the light sensing apparatus from at least one of the optical fibers, the light sensing apparatus comprising a plurality of pixels to measure the received light;
an optical element positioned within a path of light, the optical element having optical characteristics that expand a field of view of the at least one of the optical fiber by focusing the light on an end face of the at least one optical fiber, wherein the optical element is coupled to the sensor and has a concave surface positioned adjacent to the sensor; and
a control element coupled to the light sensing apparatus to receive a value indicative of a measurement of the portion by the light sensing apparatus and having a processor to determine a direction of the projectile from the sensor based on the value.

11. The system of claim 10, wherein the control element is configured to determine a location of the object with respect to a geographical coordinate system based on the determined direction.

12. The system of claim 11, wherein the control element is configured-to provide an output indicative of the location to the output interface.

13. The system of claim 10, wherein the optical element has lenslet positioned within the path of the light.

14. The system of claim 10, wherein the optical element has a first portion within the path of the light and a second portion within the path of the light, the first portion having an index of refraction different than an index of refraction of the second portion.

15. The system of claim 10, wherein the optical element is coupled to the sensor.

16. The system of claim 15, wherein the optical element has a lenslet formed on a surface defining a sealed space.

17. The system of claim 15, wherein the optical element defines a sealed space within the path of the light.

18. The system of claim 17, wherein a gas within the sealed space has a refractive index different than a refractive index of the optical element.

19. The system of claim 10, wherein a centerline of each of the optical fibers is substantially perpendicular to the convex surface.

20. The system of claim 10, wherein the concave surface of the optical element has a radius of curvature substantially equal to a radius of curvature of the convex surface of the sensor.

21. The system of claim 10, wherein the concave surface of the optical element has a radius of curvature less than a radius of curvature of the convex surface of the sensor.

* * * * *